(12) United States Patent
Yang et al.

(10) Patent No.: US 8,064,005 B2
(45) Date of Patent: Nov. 22, 2011

(54) LIGHT SUPPLYING UNIT AND DISPLAY DEVICE USING THE SAME

(75) Inventors: Yong-Seok Yang, Asan-si (KR); Jin-Ho Ha, Suwon-si (KR); Jung-Tae Kang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 349 days.

(21) Appl. No.: 12/183,556

(22) Filed: Jul. 31, 2008

(65) Prior Publication Data

US 2010/0026924 A1 Feb. 4, 2010

(51) Int. Cl.
*G02F 1/1335* (2006.01)
(52) U.S. Cl. ........................................ 349/58
(58) Field of Classification Search ............ 349/58
See application file for complete search history.

(56) References Cited

U.S. PATENT DOCUMENTS

| | | | |
|---|---|---|---|
| 5,432,626 A * | 7/1995 | Sasuga et al. | 349/58 |
| 6,407,781 B2 * | 6/2002 | Kitada | 349/58 |
| 6,992,734 B1 * | 1/2006 | Morishita et al. | 349/58 |
| 2008/0165305 A1 | 7/2008 | Miyamoto | |

FOREIGN PATENT DOCUMENTS

| | | |
|---|---|---|
| JP | 2001076529 | 3/2001 |
| KR | 1020030084016 | 11/2003 |
| KR | 1020060125083 | 12/2006 |
| KR | 1020070077678 | 7/2007 |

OTHER PUBLICATIONS

European Office Action for Application No. 09 004 622.8-2205 dated Sep. 9, 2011.

* cited by examiner

*Primary Examiner* — James A Dudek
(74) *Attorney, Agent, or Firm* — Cantor Colburn LLP (57) ABSTRACT

A display device includes a container having a bottom plate, a light source disposed in the container, which provides light, a circuit board disposed in the container, a socket terminal electrically connected to the light source and the circuit board, and a display panel which receives the light from the light source and displays images. The circuit board and the light source are positioned on a same side of the bottom plate of the container. The socket terminal includes a socket part and a fixing part, the socket part and the fixing part are connected to the light source and circuit board, respectively.

17 Claims, 7 Drawing Sheets

LIGHT SUPPLYING UNIT AND DISPLAY DEVICE USING THE SAME

BACKGROUND OF THE INVENTION

1. Field of the Invention

The present invention relates to a light supplying unit and a display device using the light supplying unit, more particularly to a light supplying unit and a display device having a socket-type terminal for a light source.

2. Description of the Related Art

A conventional liquid crystal display ("LCD") device is known for having several advantages such as thinness, lightness and low voltage consumption among various display devices. The LCD device needs light from an outside source since a LCD panel of the LCD device, which displays images cannot emit light itself. Thus, the LCD device needs a light supplying unit for providing the LCD panel with light. The light supplying unit uses a light source and/or an optical component such as an optical film or plate to enhance brightness and uniformity of light. The light source is a lamp such as a cold cathode florescent lamp ("CCFL"), a hot cathode florescent lamp ("HCFL"), and an external electrode florescent lamp ("EEFL").

Generally, when the lamp is assembled in the light supplying unit, the lamp is soldered with a wire for transferring power to drive the lamp and held by a holding means such as lamp holder. However, the soldering process has various problems such as deterioration at a joint of the lamp and the wire, and low throughput resulting from manual soldering process, etc.

BRIEF SUMMARY OF THE INVENTION

Exemplary embodiments of the present invention provide a light supplying unit and a display device using the same, which can increase reliability and throughput. The thickness of the display device can be slimmer as well.

In an exemplary embodiment, the present invention provides a display device which includes a container having a bottom plate, a light source disposed in the container, which provides light to the display device, a circuit board disposed in the container, a socket terminal electrically connected to the light source and the circuit board, and a display panel positioned to receive the light provided from the light source.

According to an exemplary embodiment, the circuit board and the light source are positioned on a same side of the bottom plate. The socket terminal includes a socket part and a fixing part. The socket part and the fixing part are connected to light source and the circuit board, respectively.

In another exemplary embodiment, the present invention provides a display device which includes a container including a bottom plate, a light source disposed in the container, which provides light to the display device, a circuit board disposed perpendicular to the bottom plate of the container, a socket terminal electrically connected to the light source and the circuit board, and a display panel positioned to receive the light provided from the light source.

In another exemplary embodiment, the present invention provides a light supplying unit which includes a light source positioned in a linear direction, a circuit board having a circuit which transfers power for driving the light source, and a socket terminal directly connected to the light source and the circuit board. According to an exemplary embodiment, the linear direction of the light source is perpendicular to a major plane of the circuit board.

BRIEF DESCRIPTION OF THE DRAWINGS

The above and/or other aspects, features, and advantages of the present invention will become more apparent from the following detailed description when taken in conjunction with the accompanying drawings, in which.

DETAILED DESCRIPTION OF THE INVENTION

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be described in further detail with reference to the accompanying drawings.

Figure 1A:
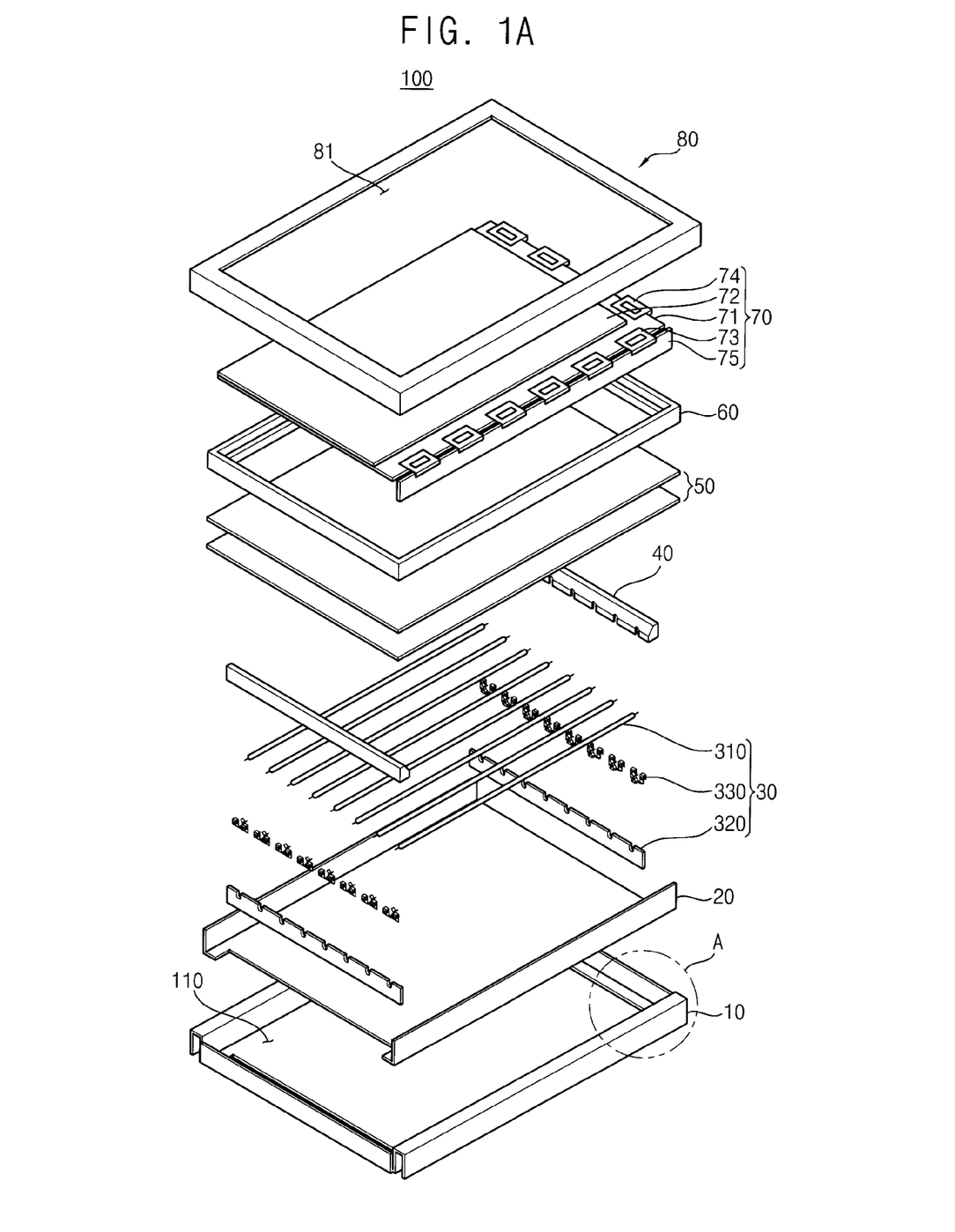
FIG. 1A is a schematic exploded perspective view of an exemplary embodiment of a LCD device according to the present invention.
Figure 1B:
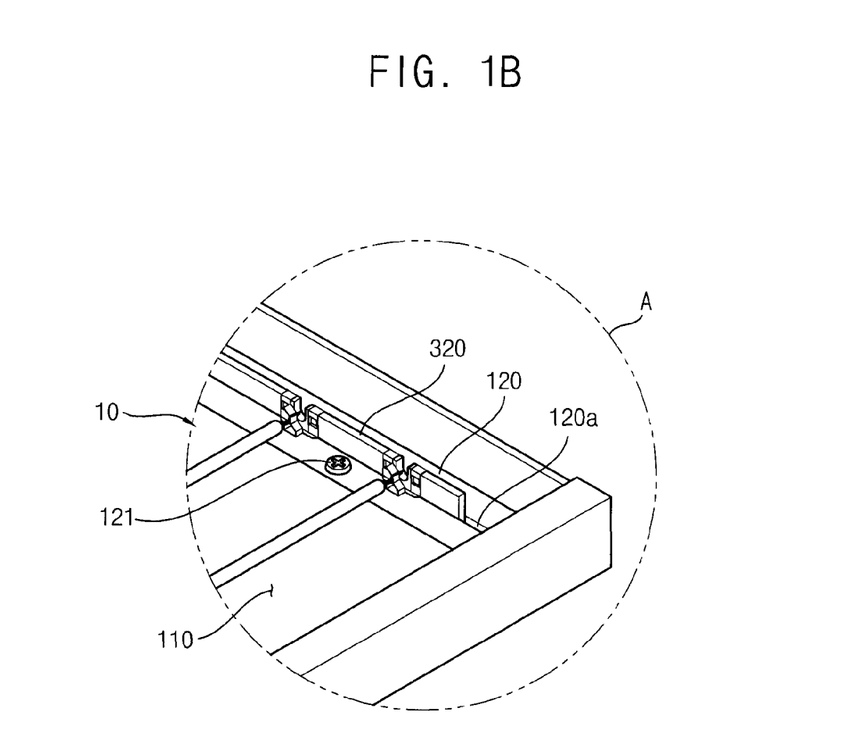
FIG. 1B is an enlarged detail view of a portion encircled by the dashed line "A" of FIG. 1A.

FIGS. 1A and 1B are a schematic exploded perspective view of an exemplary embodiment of a LCD device and an enlarged detail view of the portion encircled by the dashed line "A" of FIG. 1A according to the present invention, respectively.

Referring to FIGS. 1A and 1B, a LCD device 100 including a receiving container 10, a light supplying unit 90, a panel guide 60, a LCD panel 70 and a top frame 80. According to an exemplary embodiment, the light supplying unit 90 is disposed in the receiving container 10 and includes a reflector 20 which reflects light toward the LCD panel 70, a light source assembly 30 which generates light, a side cover 40 which covers an end of the light source assembly 30, and optical components 50 such as a brightness enhancement film and a diffuser. However, the present invention is not limited to the optical components 50 being a brightness enhancement film and a diffuser, and may vary accordingly. The light source assembly 30 includes a lamp 310 as a light source, a circuit board 320, and a socket terminal 330 which connects the lamp 310 with the circuit board 320. According to an exemplary embodiment, the circuit board 320 includes a circuit and a component such as an inverter to transfer power from a power supply unit (not shown) to the lamp 310. As shown in FIGS. 1A and 1B, the lamp 310 is connected to the circuit board 330 through the socket terminal 330. There may be a missing part 323 (depicted in FIG. 3) at the edge 321 of the circuit board 320 to prevent the lamp 310 from being in direct contact with the circuit board 320 when the lamp 310 is inserted into the socket terminal 330. The circuit board 320 is disposed in the receiving container 10. The circuit board 320 is positioned perpendicular to a bottom plate 110 of the receiving container 10. As shown in FIG. 1B, according to an exemplary embodiment, the circuit board 310 is held by a board holding part 120 on an inner side of the bottom plate 110. According to the description above, the light supplying unit 90 according to the current exemplary embodiment, is slimmer than a light supplying unit having the circuit board which is mounted on an outer side of the receiving container.

The board holding part 120 includes a groove 120a which receives and holds the circuit board 320. The board holding part 120 is mounted on the bottom plate 110 of the receiving container 10 via a fixing means 121 such as a screw. The board holding part 120 is not limited to any particular shape and may be mounted on other places such as a sidewall of the receiving container 10, for example. Also, according to an exemplary embodiment, the board holding part 120 may be integrally formed with the receiving container 10.

Figure 2:
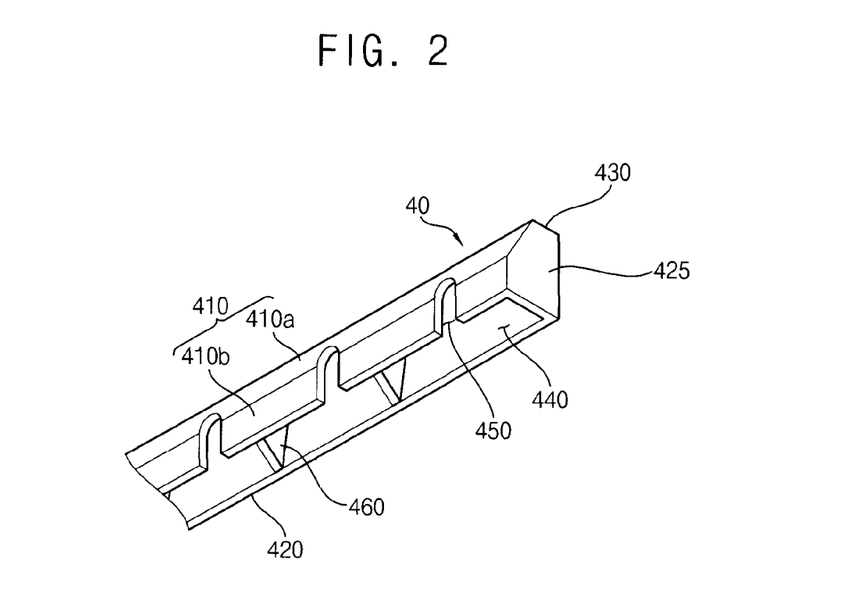
FIG. 2 is a perspective view of a side cover of FIG. 1 according to an exemplary embodiment of the present invention.

The side cover 40 covers an end of the lamp 310 and the circuit board 320. FIG. 2 is a perspective view of the side cover 40. As shown in FIG. 2, according to an exemplary embodiment, the side cover 40 includes a front surface 410, a rear surface 420, a side surface 425, a top surface 430, and a cavity 440 therein. The side cover 40 reflects light from the lamp 310 to brighten around an end of the lamp 310, which is a non-emitting area. The front surface 410 is divided into a first surface 410a and a second surface. The first surface 410a is inclined to reflect more light toward the LCD panel 70. The second surface 410b may have an opening 450 to accommodate lamp 310. A partition 460 may be provided between openings 450 to insulate each of the lamps 310 (see FIG. 1) from one another.

Referring back to FIG. 1A, the panel guide 60 may be used to support the LCD panel 70. The panel guide 60 also prevents the optical components 50 from moving. The LCD panel 70 include two substrates 71 and 72 facing and adhered to each other. Liquid crystal molecules (not shown) are disposed between the two substrates 71 and 72. Gate lines and data lines (not shown) are formed on one of the substrates 71 or 72 and define pixels by intersecting each other. A thin film transistor (not shown) is electrically connected with the gate line and the data line. Gate and data driving parts 73 and 74 transfer gate and data signals to the gate line and the data line, respectively. A printed circuit board ("PCB") 75 may be electrically connected to the gate and data driving parts 73 and 74 having imprinted wires and electrical components (not shown). The top frame 80 includes an opening 81 which exposes an active area displaying images. According to an exemplary embodiment, the top frame 80 may be combined with the receiving container 10 or other parts to fix other elements such as the light supplying unit 90 and the LCD panel 70 to be fixed.

Figure 3:
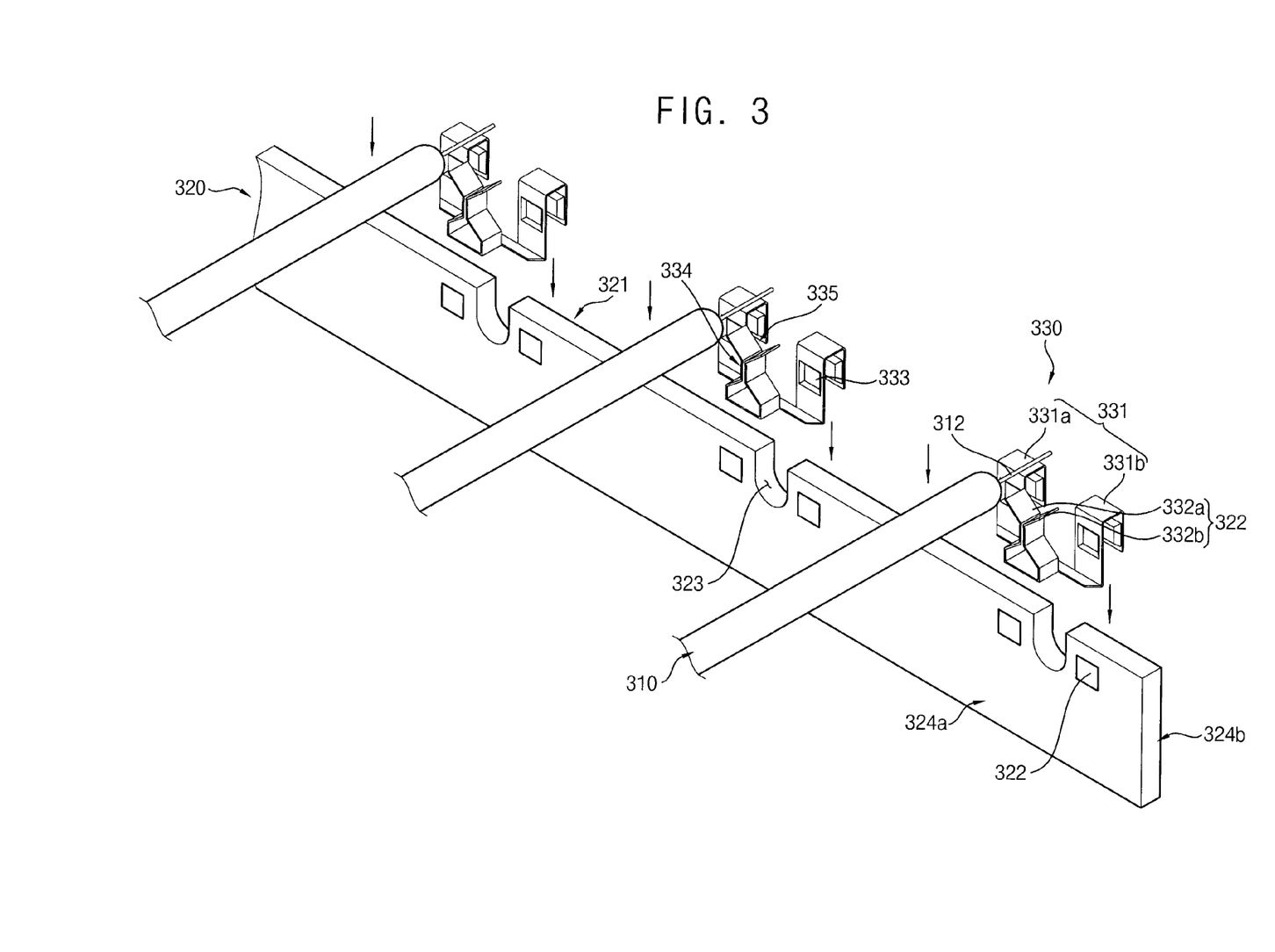
FIG. 3 is an exploded perspective view of a light source assembly of FIG. 1 according to an exemplary embodiment of the present invention.
Figure 4A:
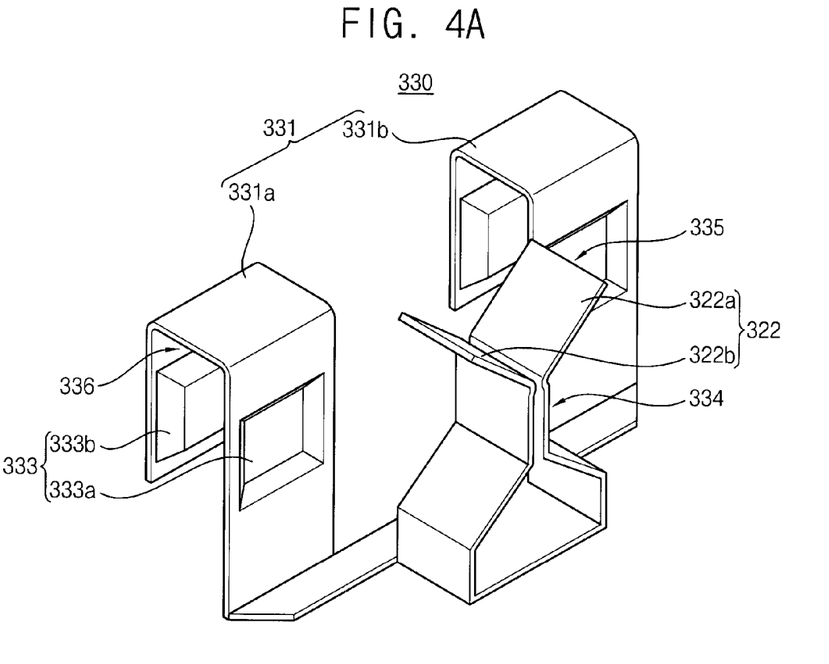
FIG. 4 is perspective rear view of a socket terminal of FIG. 1 according to an exemplary embodiment of the present invention.
Figure 4B:
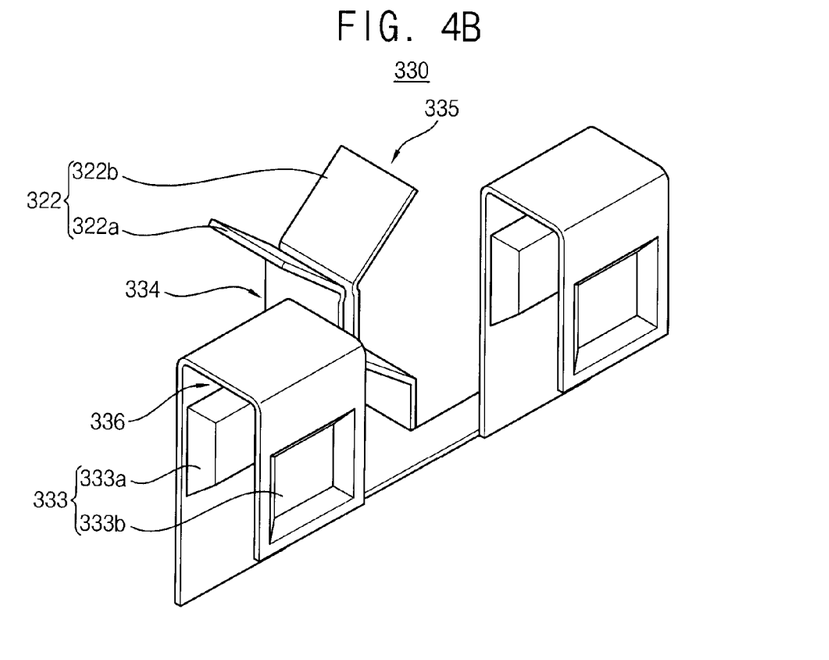

FIGS. 3 and 4 are an exploded perspective view of a light source assembly and a perspective rear view of a socket terminal, respectively, according to an exemplary embodiment of the present invention.

Referring to FIGS. 3 and 4, the socket terminal 330 includes a fixing part 331 and a socket part 332. According to an exemplary embodiment, the socket part 332 and the fixing part 331 are integrally formed. Also, the socket part 332 and the fixing part 331 are entirely conductive. The socket part 332 includes two branches 332a and 332b. Middle parts of the branches 332a and 332b are bent to each other to form a lamp holding portion 334 and a lamp guiding portion 335. The branches 332a and 332b of the lamp holding portion 334 hold the lamp electrode 312. Therefore, the lamp 310 is held by and electrically connected to the socket part 332 without any bonding processes such as soldering. A distance between the branches 332a and 332b of at least a part of the lamp guiding portion 335 may be wider than a distance between the branches 332a and 332b of the lamp holding portion 334 for the lamp electrode 312 to be easily inserted in. The lamp electrode 312 may be inserted down into the lamp holding portion 334 via the lamp guiding portion 335. The lamp electrode 312 may be formed as a lead wire as shown in FIG. 3.

According to an exemplary embodiment, the fixing part 331 includes a bent portion 336. The bent portion 336 is hung on an edge 321 of the circuit board 320. One fixing part 331 may be used, however, the present invention is not limited hereto, and two or more fixing parts 331a and 331b may be formed to increase fixing reliability. The fixing part 331 may include a contact portion 333 to be electrically connected to a contact terminal 322 of the circuit board 320. The socket terminal 330 can be directly and electrically connected to the circuit board 320 without any medium such as wire or connector and bonding processes such as soldering. According to an exemplary embodiment, the contact portion 333 may be recessed toward the contact terminal 322 to be more easily connected to the contact terminal 322. When two or more contact terminals 322 are formed on both sides 324a and 324b of the circuit board 320, the fixing part 331 may have front and rear contact portions 333a and 333b corresponding to contact terminals 322 on both sides 324a and 324b, respectively. Therefore, according to the description above, contact reliability can be increased.

Figure 5:
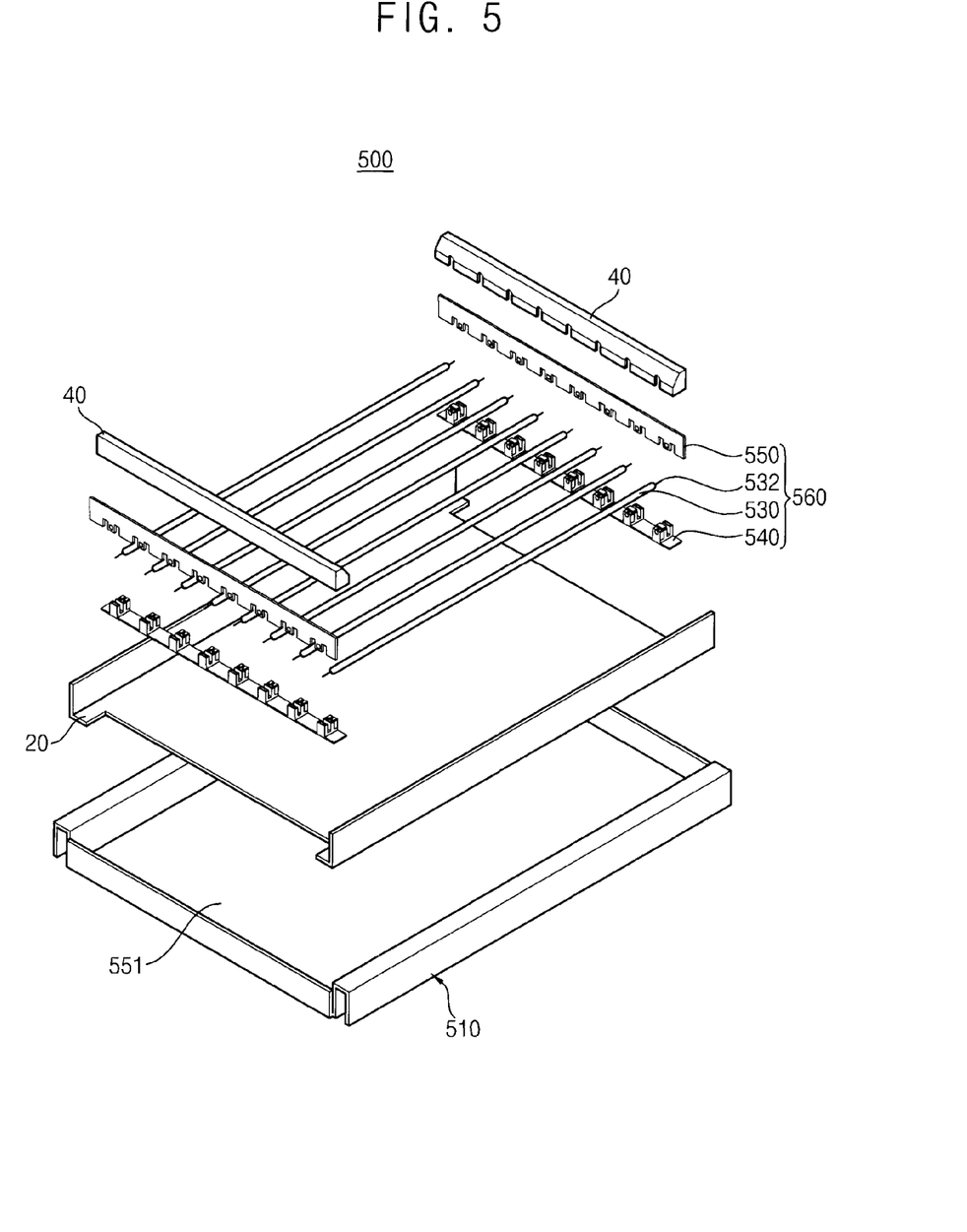
FIG. 5 is a perspective view of an exemplary embodiment of a light supplying unit according to the present invention.

FIG. 5 is a perspective view of a light supplying unit according to another exemplary embodiment of the present invention.

Referring to FIG. 5, according to an exemplary embodiment, the light supplying unit 500 includes a receiving container 510, a reflector 20, a light source assembly 560, and a side cover 40. The light source assembly 560 includes a lamp 530 as a light source, a lamp electrode 532, a socket terminal 540 and a circuit board 550. The socket terminal 540 connects the lamp 530 to the circuit board 550 to transmit lamp driving power from the circuit board 550 to the lamp 530.

Figure 6:
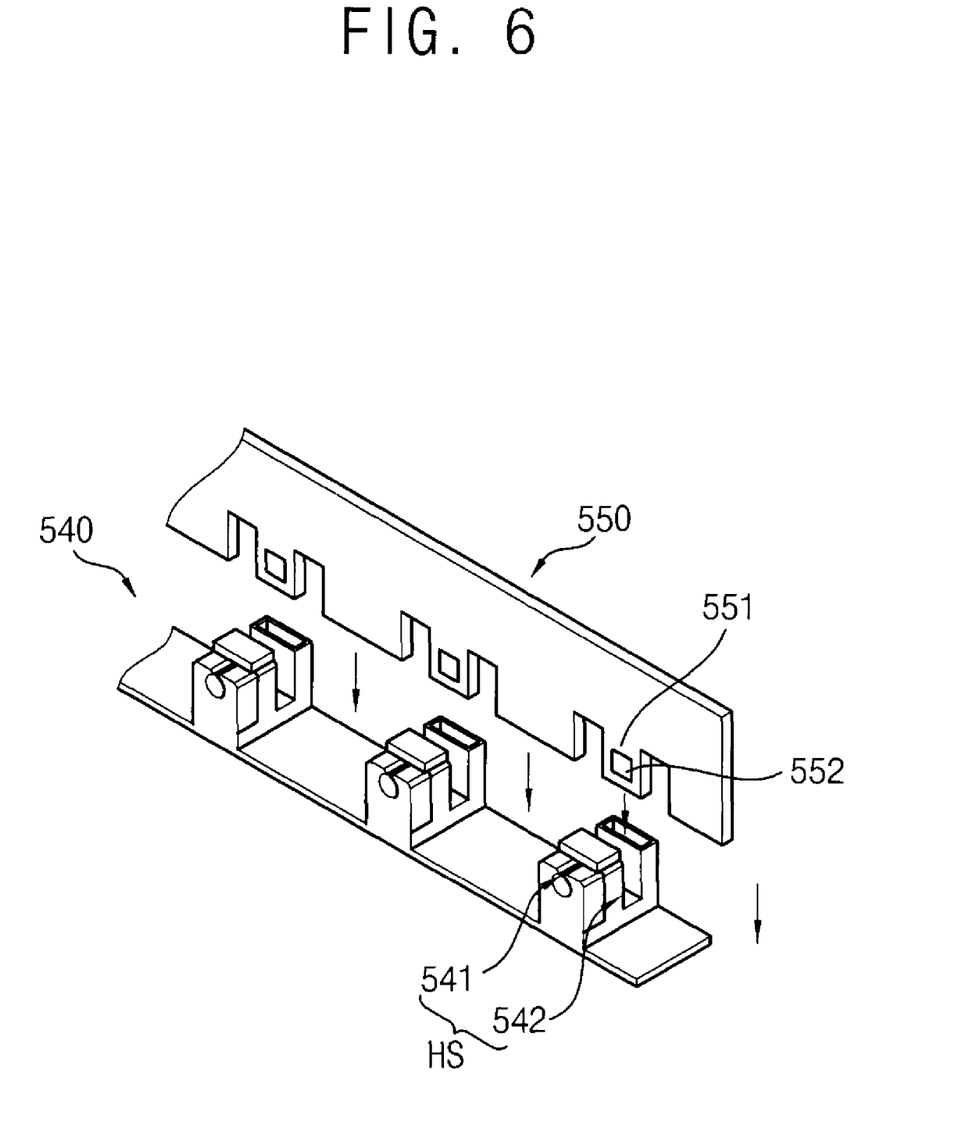
FIG. 6 is an exploded perspective view of a light source assembly of FIG. 5 according to an exemplary embodiment of the present invention.

FIG. 6 is an exploded perspective view of a light source assembly of FIG. 5 according to another exemplary embodiment of the present invention.

Referring to FIG. 6, the socket terminal 540 is mounted on a bottom plate 511 of the receiving container 510. Each of the socket terminals 540 is connected to one another for higher assembly efficiency. However, each of the socket terminals 540 may be separated from one another (not shown) in some embodiments of the invention. The socket terminal 540 includes a housing H which is non-conductive and a conductive terminal C positioned in the housing H (see FIG. 7).

According to an exemplary embodiment, the housing H includes a housing socket part HS and a housing fixing part HF. The housing socket part HS includes a front receiving part 541 and a rear receiving part 542. The front receiving part 541 receives a body of the lamp 530 therein. The front receiving part 541 provides a front wall 541a to support a body of the lamp 530. The rear receiving part 542 may receive the lamp electrode 532 therein. According to an exemplary embodiment, a socket cover 570 may be provided to prevent the lamp electrode 532 from being separated from the socket terminal 540. The front and rear receiving part 541 and 542 may have open top portions, respectively. Accordingly, the lamp 530 may be inserted into the housing socket part HS downward via the open top portions, and the socket cover 570 may be inserted into the rear receiving part 542 via the open top portion of the rear receiving part 542 thereafter.

The housing fixing part HF includes a space 544 with an opening at the top which receives and holds a part of the circuit board 550. The circuit board 550 includes a protruding edge 551 for being inserted down into the space 544 via the opening. The circuit board 550 is held upright to the bottom plate 511 of the receiving container 510. A board holding part 120 (see FIG. 1) is omitted in the current exemplary embodiment The protruding edge 551 may include a contact terminal 552 to be connected with the conductive terminal C in the housing fixing part HF.

Figure 7:
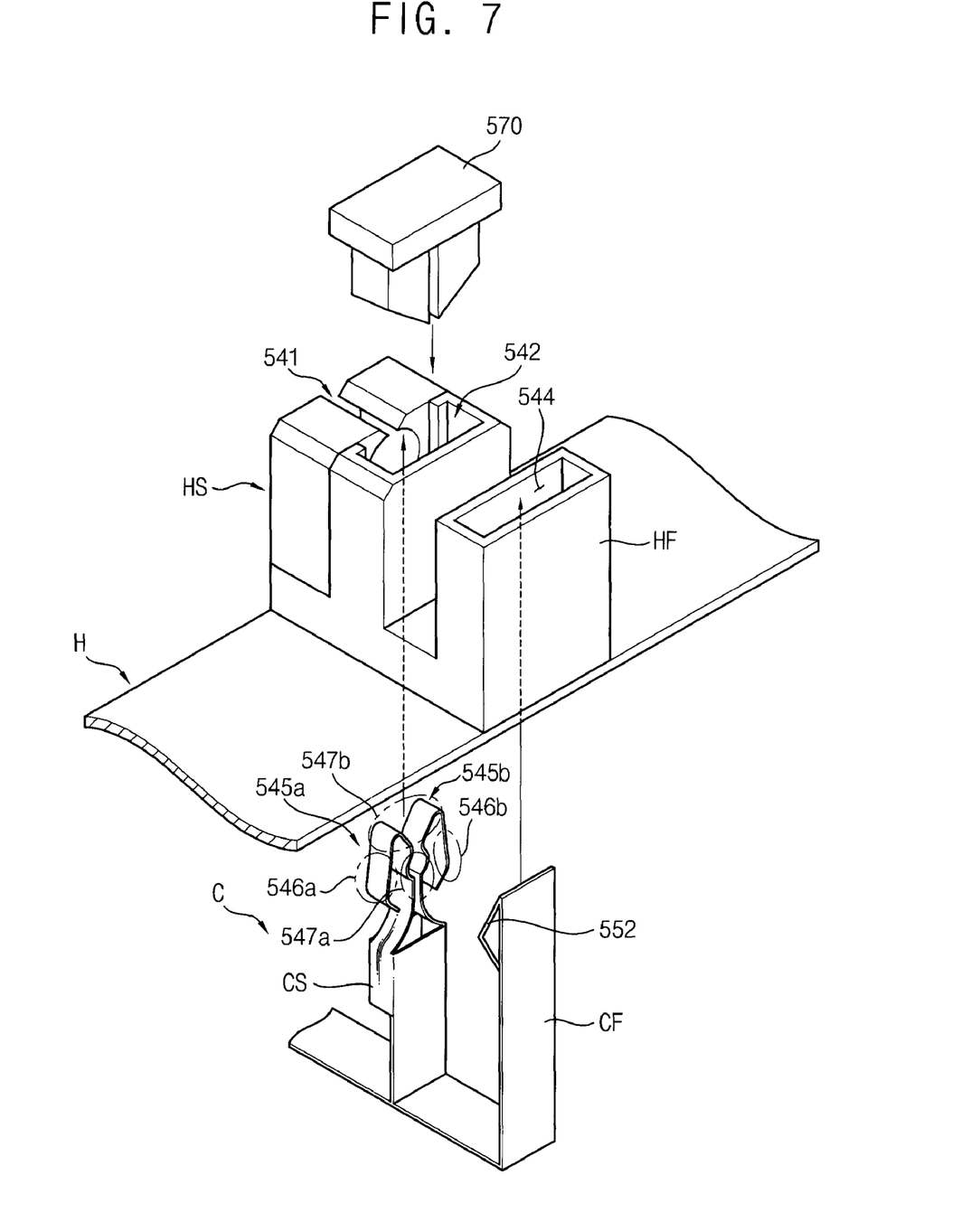
FIG. 7 is an exploded view of a socket terminal of FIG. 5 according to an exemplary embodiment of the present invention.

FIG. 7 is an exploded view of a socket terminal of FIG. 5 according to another exemplary embodiment of the present invention.

Referring to FIG. 7, the socket terminal 540 is divided into the housing H and the conductive terminal C as described above. The conductive terminal C is inserted into the housing H through an opening (not shown) at a bottom surface of the housing H. The conductive terminal C includes a conductive socket part CS and a conductive fixing part CF. The conductive socket part CS is inserted into the rear receiving part 542 of the housing socket part HS and is electrically connected to the lamp electrode 532 (see FIG. 5). The conductive fixing part CF is inserted into the space 544 of the housing fixing part HF and is electrically connected to the contact terminal 552 of the circuit board 550 (see FIG. 6).

The conductive socket part CS includes two branches 545a and 545b. The branches 545a and 545b are bent to each other to form a lamp holding portion 547a. The branches 545a and 545b of the lamp holding portion 547a may hold the lamp electrode 532. Therefore, the lamp 530 may be held by and electrically connected to the socket terminal 540 without any bonding processes such as soldering. According to an exemplary embodiment, the conductive socket part CS includes a lamp guiding portion 547b above the lamp holding portion 547a. A distance between the branches 545a and 545b of at least a part of the lamp guiding portion 547b may be wider than a distance between the branches 545a and 545b of the lamp holding portion 547a for the lamp electrode 532 to be easily inserted in. The lamp electrode 532 may be inserted down into the lamp holding portion 547a via the lamp guiding portion 547b. As shown in FIG. 7, according to an exemplary embodiment, each end of the branches 545a and 545b may include bent ends 546a and 546b to respectively push inner side walls of the rear part 542 and apply tension. Accordingly, the lamp electrode 532 can be held more tightly.

The conductive fixing part CF is positioned in the space 544 of the housing fixing part HF and is electrically connected to the contact terminal 552 of the circuit board 550 (see FIG. 7). The conductive fixing part CF may have a bent end 547 to apply tension to the circuit board 550 further securing circuit board 550. The electrical connection between the contact terminal 552 and the conductive fixing part CF can be more reliable as well.

What is claimed is:

1. A display device comprising:
a container comprising a bottom plate;
a light source disposed in the container, which provides light;
a circuit board disposed in the container, the circuit board and the light source are positioned on a same side of the bottom plate of the container;
a socket terminal electrically connected to the light source and the circuit board, the socket terminal including a socket part making contact with the light source and a fixing part connected to the socket part, the fixing part being bent so that the fixing part combines with the circuit board and covers a side edge portion defining opposing major surface planes of the circuit board; and
a display panel which receives the light from the light source and displays images.

2. The display device of claim 1, wherein the circuit board is positioned perpendicular to the bottom plate of the container.

3. The display device of claim 2, further comprising a board holding part disposed in the container and holds the circuit board.

4. The display device of claim 1, wherein the fixing part further comprises a housing having a space therein and a conductive first terminal, the conductive first terminal disposed in the space of the housing.

5. The display device of claim 4, wherein the circuit board further comprises a protruding edge and a contact terminal formed on the protruding edge of the circuit board, and
wherein the protruding edge is inserted into the space of the housing for the conductive first terminal to be connected with the contact terminal.

6. The display device of claim 5, wherein the fixing part comprises a contact portion recessed to be electrically connected to the contact terminal of the circuit board.

7. The display device of claim 1, wherein the socket part comprises a pair of branches, and
wherein middle portions of the branches are bent to each other to form a holding portion and a guiding portion, the holding portion holds the light source, and the guiding portion guides the light source toward the holding portion.

8. The display device of claim 7, wherein a distance between the branches of the guiding portion is wider than a distance between the branches of the holding portion.

9. The display device of claim 7, the light source comprising an electrode which is inserted into the holding portion via the guiding portion, wherein the electrode of the light source is a lead wire.

10. The display device of claim 1, wherein the socket terminal is entirely conductive.

11. The display device of claim 1, wherein the socket terminal is directly connected to the light source and the circuit board.

12. The display device of claim 1, wherein the fixing part and the socket part are integrally formed.

13. A display device comprising:
a container comprising a bottom plate;
a light source disposed in the container, which provides light;
a circuit board disposed perpendicular to the bottom plate of the container;
a board holding part disposed on the bottom plate and holding the circuit board, the board holding part including a groove which receives a side edge portion defining opposing major surface planes of the circuit board;
a socket terminal electrically connected to the light source and the circuit board; and
a display panel which receives the light from the light source and displays images.

14. The display device of claim 13, wherein the circuit board and the light source are positioned at a same side of the bottom plate.

15. The display device of claim 13, wherein the socket terminal is directly connected to the light source and the circuit board.

16. A light supplying unit comprising:
a light source positioned in a linear direction;
a circuit board comprising a circuit which transfers power for driving the light source, the circuit board having opposing major surface planes, the circuit board comprising a protruding edge of a side edge portion which defines the opposing major surface planes and a contact terminal formed on the protruding edge; and
a socket terminal directly connected to the light source and the circuit board, the socket terminal including a conductive terminal and a housing which has a socket housing part partially inserting the conductive terminal and a fixing housing part partially inserting the conductive terminal and the protruding edge of the circuit board,
wherein the linear direction of the light source is perpendicular to the major plane of the circuit board.

17. The light supplying unit of claim 16, wherein the contact terminal of the circuit board is electrically connected to the conductive terminal of the socket terminal in the fixing housing.

* * * * *